United States Patent Office 3,199,645
Patented Aug. 10, 1965

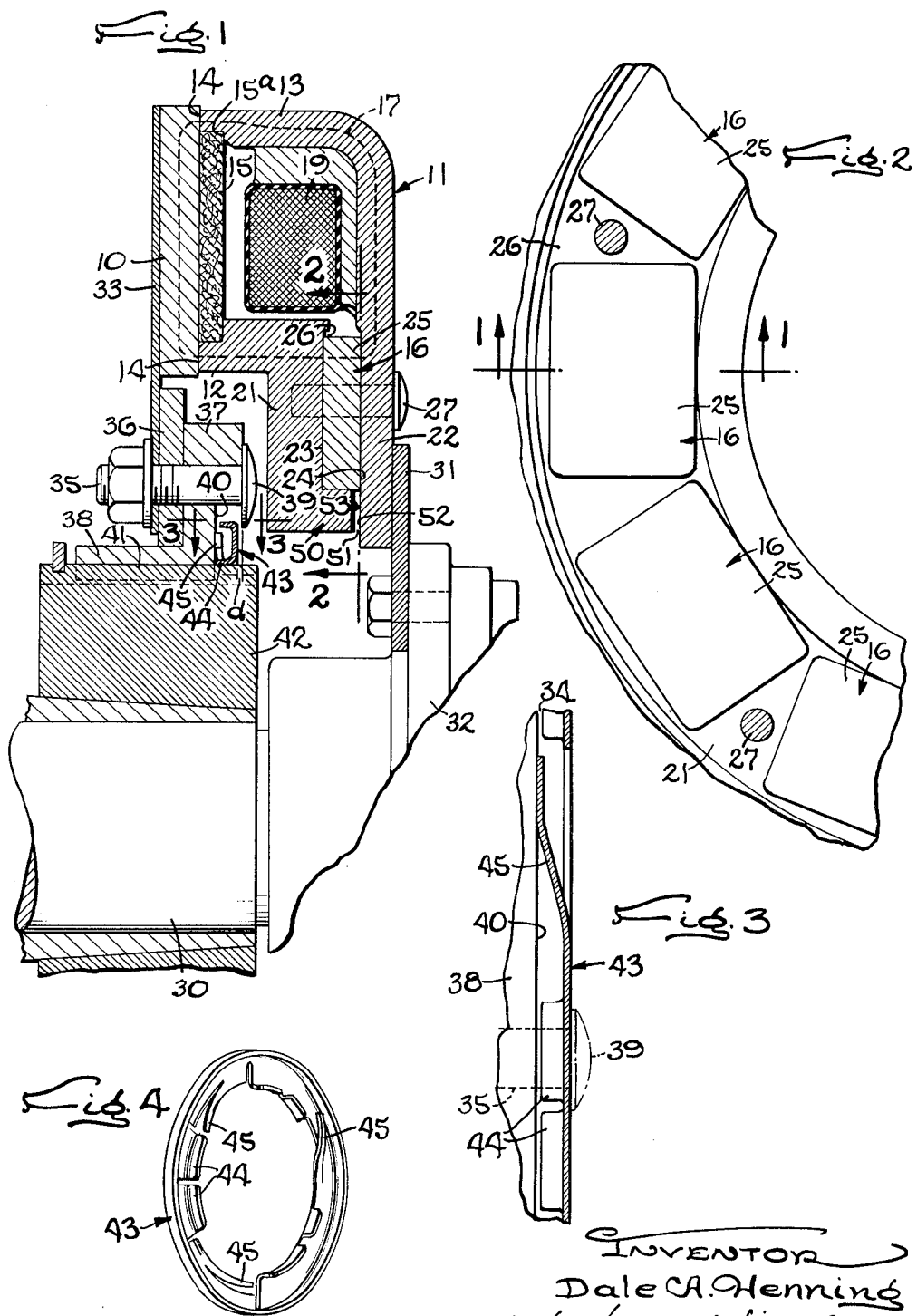

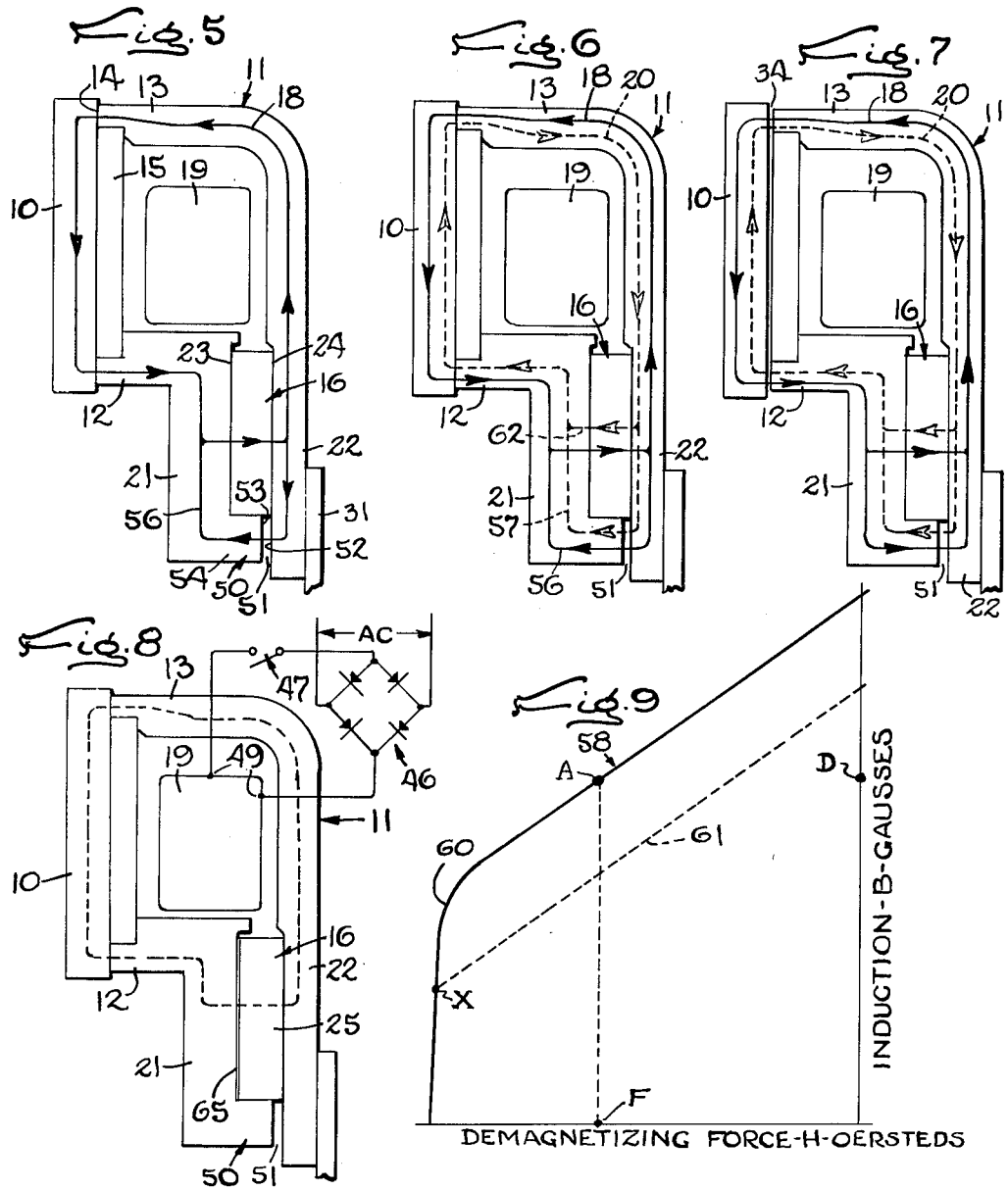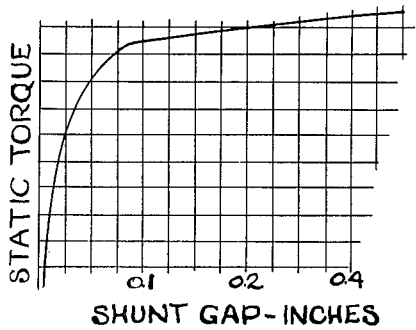

3,199,645
ELECTROMAGNETIC FRICTION COUPLING
Dale A. Henning, Janesville, Wis., assignor to Warner
  Electric Brake & Clutch Company, South Beloit, Ill., a
  corporation of Delaware
Filed Mar. 22, 1963, Ser. No. 267,269
11 Claims. (Cl. 192—84)

This invention relates to electromagnetically controlled friction couplings of the so-called fail-safe type in which an armature is drawn into gripping engagement with the face of a magnet by flux derived from a permanent magnet and is released upon energization of a winding arranged to produce a flux opposing and in effect neutralizing the permanent magnet flux at the working face of the coupling. More particularly, the invention has reference to such coupling in which the permanent flux and the electromagnet or neutralizing flux thread a common circuit extending serially through the permanent magnet and the armature.

The general object is to provide a coupling of the above character which, as compared to prior similar couplings, will develop substantially greater torque for a given over-all size, will develop a torque substantially as great as an electromagnetically engaged coupling of equal size, will maintain its rated torque output over long periods of service use, and will disengage in response to a lower applied voltage and in a shorter time and more reliably in spite of variations in the applied release voltage.

Another object is to effectually release the coupling without the necessity of all of the neutralizing flux threading through the permanent magnet.

A further object is to provide such a coupling in which the demagnetizing force applied to the permanent magnet as an incident to release of the coupling is insufficient to drive the permanent magnet below the knee of its demagnetization curve.

The invention resides in the novel and simple character of the means employed for achieving the foregoing objects.

Other objects and advantages of the invention will become apparent from the folowing detailed description taken in connection with the accompanying drawings, in which FIGURE 1 is a fragmentary diametrical sectional view of the improved friction coupling, the section being taken along the line 1—1 of FIG. 2.

FIGS. 2 and 3 are fragmentary sections taken respectively along the lines 2—2 and 3—3 of FIG. 1.

FIG. 4 is a perspective view of one of the parts.

FIGS. 5, 6 and 7 are diagrammatic views respectively illustrating the distribution and direction of the magnetic fluxes when the coupling is engaged, at the time of application of the release voltage, and while the coupling is released.

FIG. 8 is a view similar to FIG. 1 but showing a modified form of the permanent magnet flux path.

FIG. 9 shows the demagnetizing part of the hysteresis loop of the permanent magnet.

FIG. 10 is a curve showing the variation of the output torque with changes in the gap forming the high reluctance part of the magnetic shunt.

While the invention is applicable to various kinds of couplings for transmitting rotary power, it is shown in the drawing for purposes of illustration incorporated in a friction brake engaged by flux from a permanent magnet and released by energization of an electromagnet and comprising generally a rotatably mounted armature 10 in the form of a flat magnetic iron ring and a stationarily mounted magnet 11 including a core ring of magnetic material and generally U-shaped radial cross-section having radially spaced inner and outer pole pieces 12 and 13 concentric with the ring axis and terminating at their ends in faces or poles 14 which lie in a common plane. The pole faces are spanned by the armature ring and are flush with the outer surface of non-magnetic wear resistant friction material in the form of segments 15 seated against shoulders 15ª on the pole pieces.

Interposed in a flux circuit 17 (FIG. 1) of toroidal shape extending through the armature and the pole pieces 12 and 13 is a permanent magnet 16 which when active produces a flux which is indicated at 18 (FIG. 5) and which threads the circuit 17 and draws the armature into gripping engagement with the friction face of the magnet but which may be opposed by energization of a winding 19 enclosed by the circuit 17 and adapted when energized to produce a flux indicated at 20 (FIGS. 6 and 7) which threads the circuit serially and through the permanent magnet in a direction opposite to the flux 18 so as to effectually neutralize the permanent magnet at the pole faces 14 thus releasing the coupling. While the permanent magnet may be located in different parts of the flux circuit 17, it is disposed in the present instance between a substantially flat radially disposed flange 21 integral at one end with and projecting laterally from the pole piece 12 and a similar flange 22 integral with and projecting laterally from the pole piece 13 so as to provide opposed surfaces abutting opposite ends of the permanent magnet. Herein, the flanges 21 and 22 are turned inwardly in order to reduce the over-all diameter of the unit to a minimum.

The permanent magnet 16 is composed of material which produces a normal flux directed therethrough from one pole face 23 to the other 24 but which will withstand without substantial demagnetization the application of the opposing flux of substantial magnitude. Permanent magnets having these properties are usually composed of ceramic material such as barium ferrite, examples of such material being those sold under the trade names of Arnox V and Indox V and manufactured by Arnold Engineering Company and Indiana Steel Products. As is well known, such material possesses a relatively high magnetic reluctance which is utilized to advantage by the present invention as later described.

While the permanent magnet may comprise a single piece annulus, it is preferred to employ an annular series of standardized shallow blocks or wafers 25 of generally rectangular shape seated in a groove 26 in the flange 21 and arranged in edge to edge relation as shown in FIG. 2. Herein, the wafers are clamped between the flanges 21 and 22 by series of bolts 27 extending through holes in one flange and the spaces between adjacent wafers and threading into the other flange. The pole pieces and permanent magnet are thus joined together in a rigid assembly with the poles of blocks 25 in firm face to face contact with the opposing surfaces of the flanges 21 and 22.

The flux density produced in the circuit 17 is determined by the cross-sectional area of the permanent magnet in a direction normal to the flux path. To work the pole faces 14 substantially at the saturation point, for example, 110,000 lines per square inch, a 15.25 inch brake having the cross-sectional proportions shown in FIG. 1 would employ about sixteen segments 25 each 1.75 x 1.25 inches in size. To produce the desired M.M.F. which is determined by the thickness along the path 17, the wafers 25 are .312 of an inch thick in the present instance.

The armature 10 and magnet 11 may be mounted in different ways depending on whether the coupling is to be used as a friction brake for arresting the motion of a rotary part such as a shaft 30 or as a clutch for frictionally coupling two rotary parts together for rotation in unison. In the friction brake shown herein, the magnet core is mounted stationarily as by welding the inner edge portion of the flange 22 to a plate 31 bolted to a fixed support 32. The armature 10 may comprise a single piece ring or a plurality of segments arranged end to end around and welded to a backing 33 mounted as disclosed in Patent 2,970,681 for a short axial movement into and out of engagement with the magnet face to automatically introduce a narrow gap 34 (FIGS. 3 and 7) between the two when the coupling is released. For a reason to appear later, this gap is of predetermined width, being about .0625 of an inch in this instance.

As explained more fully in said patent, this may be accomplished by extending angularly spaced bolts 35 through holes in a ring 36 secured to the inner periphery of the backing 33 and through a flange 37 on a sleeve 38 to clamp the two together leaving the inner edge portions of bolt heads 39 exposed within an annular recess 40. The sleeve is toothed internally to mate with teeth 41 around a collar 42 along which the sleeve is freely slidable axially, the collar being fixed to the shaft 30. A channel-shaped ring 43 surrounds the hub teeth 41 which are gripped frictionally by lugs 44 struck out of the resilient metal of the ring. Tangentially extending and angularly spaced spring fingers 45 on the ring bear against the flange 37 at the bottom of the recess 40 and urge the sleeve and the armature mounting outwardly along the spline teeth 41. The lugs 44 thus contracted resiliently around the teeth 41 of the sleeve produce a combined friction gripping force which is sufficient to hold the ring in fixed axial position when the brake is deenergized but substantially less than the force exerted by the magnet in attracting the armature 10 to the pole faces. The stiffness of the spring finger 45 is also correlated with this friction force so as to bend axially under a force substantially less than the friction force tending to maintain its axial position on the sleeve 38.

The ring 43 thus constructed is pressed onto the collar 41 with the fingers 45 in contact with the bottom of the recess 40 the depth of which is such that with the armature 10 attracted against the magnet and the ends of the fingers 45 bent axially, the back surface of the ring 43 will be spaced from the heads 39 of the bolts 35 a distance $d$ (FIG. 1) equal to the width of the gap 34 desired to be maintained between the armature 10 and pole faces 14 when the brake is released. Thus, the ring 43 acting as above described moves the armature 10 away from the magnet to introduce the gap 34 in the flux circuit 17 each time the brake is disengaged and this, in spite of wearing off of the gripping faces of the coupling.

The winding 19 is correlated in its construction and energization with the strength of the permanent magnet 16 and is adapted when energized by direct current flowing in the proper direction to create the flux 20 threading the circuit 17 in opposition to the permanent magnet flux 18 as indicated by the arrows in FIG. 6. A neutralizing magnetomotive force in the range of 716 to 930 ampere turns will effect release of the armature from the poles, with the optimum release being at 860 ampere turns. The coil is designed to produce the required M.M.F. with an applied voltage in the range of 70 to 91 volts with the optimum speed of release at 84 volts. Direct current at the desired voltage, preferably about 84 volts, may be derived from an alternating current source through a suitable rectifier 46 and applied across the insulated terminals 49 by closure of a switch 47.

In accordance with the present invention, means is provided for utilizing the flux 20 created by energization of the winding 19 to effect neutralization of the permanent magnet flux 18 at the working or pole faces 14 and proper release of the coupling without the necessity of forcing all of that flux through the permanent magnet against the inherently high reluctance of the latter. Instead a substantially part of the coil flux is by-passed around the permanent magnet and as a result the M.M.F. required to release the coupling does not appear entirely across the permanent magnet thus avoiding permanent partial demagnetization of the permanent magnet. The aforesaid means comprises a magnetic shunt 50 of proper flux carrying capacity arranged in parallel with that part of the series flux circuit 17 which includes the permanent magnet 16 and having a reluctance substantially higher than that of the remainder of the flux circuit 17 when the armature 10 is in contact with the pole faces 14 (FIGS. 5 and 6) and also when it is separated (FIG. 7) and the brake released.

While the shunt may take various forms, it is preferred for the sake of structural simplicity and ease of correlation with the magnetic parts above described to employ a magnet iron member arranged in parallel with and extending around the permanent magnet 16 and having interposed therein a narrow gap 51 of air or other high reluctance medium determining the flux carrying capacity of the shunt. Herein the gap is disposed around the inner edge of the magnet and defined on one side by the surface 52 of the core flange 22 which is projected inwardly beyond the magnet. The other wall of the gap is the annular end surface 53 of a right angular extension 54 of the inner pole piece flange 21 formed integral with the latter and concentric with the permanent magnet. The gap walls parallel each other and are spaced apart to impart the desired over-all reluctance to the annular shunt. As shown in FIG. 10, the torque output of the coupling varies with the thickness of the gap 51 which should in general be made as short as possible while keeping the neutralizing flux for releasing the brake as low as possible, holding the release and pickup times required for effective disengagement and reengagement of the brake at a minimum, and making the voltage range within which the brake will be released as large as possible.

Attainment of the foregoing objectives is achieved in accordance with the present invention by a novel correlation of the reluctances of the parallel flux paths through the peramnent magnet on the one hand and the magnetic shunt 50 on the other so that only a small part indicated at 56 (FIG. 5) of the permanent magnet flux is by-passed through the shunt and thus lost when the permanent magnet alone is active while a substantial part 57 (FIG. 6) of the coil flux 20 required for neutralizing the permanent magnet flux is carried by the shunt thus effecting proper release of the brake without subjecting the permanent magnet to a demagnetizing force of detrimental magnitude. To these ends, the length of the gap 51 is made such that the reluctance of the leakage flux path 56 is sufficiently high to prevent excessive flux loss at the poles 14 when the brake is engaged. For this purpose, the gap wall 53 is sized as shown to provide a total area of 6.759 square inches and is spaced about .125 of an inch from the opposed wall 52.

The desired balance in the distribution of the permanent magnet and coil fluxes 18 and 20 is best explained by reference to the demagnetization force curve 58 (FIG. 9) for the particular permanent magnet material used. The magnetomotive force produced by the permanent magnet is a function of its length along the flux path 17 and the flux density produced in the circuit thereby is determined by the cross-section of the magnet. Knowing the magnetomotive force required and the desired flux density at the pole faces 14 for producing the desired torque output of the coupling, an operating point A is selected on the curve 58 well above the knee 60 thereof. The corresponding operating density D then determines the cross-sectional magnet area required, and the operating magnetizing force F determines the length. Since the reluctance of the shunt 50 is very high as compared to that of the iron portion of the flux circuit 17 when the armature is against the pole faces 14, very little of the permanent magnet flux will be by-passed through the shunt as indicated at 56 when the coil is deenergized.

Therefore the shunt does not detract substantially from the output of the permanent magnet.

To release the brake having a permanent magnet operating at the point A, it is necessary to energize the coil 19 at a voltage sufficient to develop a demagnetizing force well below this point. But if the voltage applied is sufficient to drive the demagnetizing force below the knee 60 of the curve, for example to a point X, the magnet will not recover its full capacity but will thereafter operate on a curve 61 instead of 58. To prevent such loss of capacity, the invention contemplates so locating the operating point A a sufficient distance above the knee 60 that the voltage required to be applied to the coil 19 to release the brake will never drive the magnet below the knee in spite of fluctuations which may occur at the voltage source in service use.

The attainment of this object in a magnetic coupling capable of a working torque of substantial magnitude is made possible in the present instance by the magnetic shunt 50 whose reluctance is made sufficiently low to carry a substantial part 57 (FIG. 6) of the coil flux 20 initially required to neutralize the permanent magnet flux at the poles 14. As a result, the demagnetizing force applied to the permanent magnet by the neutralizing flux as indicated at 62 (FIG. 6) drives the point A a substantially shorter distance down the curve 58 in effecting release of the brake. Thus, the permanent magnet may be designed to produce the desired high torque output without danger of the capacity of the magnet being reduced in service use.

If desired, the balance between the reluctances of the permanent magnet 16 and the shunt 50 when the coil 19 is energized may be adjusted conveniently by interposing a thin shim 65 (FIG. 8) of non-magnetic high reluctance material such as brass in series with the permanent magnets at any point in the pole circuit. In this design, this may be accomplished by the insertion of the shim between one end of the wafers 25 of the permanent magnet and one of the core flanges 21, 22. The thickness of the shim should ordinarily be less than .020 of an inch, a thickness of about .006 usually being adequate.

With the elements of the magnetic circuitry constructed and proportioned as above described including a .006 of an inch shim as shown in FIG. 8, it has been found that the brake will, when the coil 19 is deenergized, develop a working torque of 700 pound-feet. The torque lost because of the leakage circuit 56 will be negligible since the permanent magnet flux will take the path of least resistance through the pole faces 14 engaged by the armature 10.

Through the provision of the magnetic shunt 50 in the series type of electrically released brake above described, it has been possible to utilize the m.m.f. developed by the permanent magnet much more efficiently than has been possible with similar prior constructions and thus obtain a substantially greater output torque than has been achieved with a similar coupling of comparable size while providing for effective release of the brake. At the same time, the coupling will be releasable over a relatively wide range of voltage energizing the electromagnet coil without danger of working the permanent magnet below the knee of its demagnetization curve. Full capacity of the permanent magnet in developing an optimum torque output is preserved effectually throughout long periods of service use. These improvements in operation have been achieved with a relatively simple change in the magnetic circuitry, that is, by the simple addition of the magnetic shunt 50 properly correlated in its reluctance with that of the permanent magnet.

I claim as my invention:

1. In a magnetically controlled friction coupling, the combination of, a relatively flat annular armature, a magnet core comprising concentric first and second magnetic rings terminating at one end in laterally spaced pole faces substantially flush with each other and adapted for abutment and gripping engagement with said armature, said first ring including at its opposite end a flange projecting laterally across and beyond the second ring and said second ring including at its opposite end a lateral flange spaced from and opposing said first flange, an annular permanent magnet disposed between and abutting against the opposed surfaces of said flanges, said permanent magnet and said pole rings being joined together in a rigid magnet assembly and cooperating with said armature to form a closed series flux circuit of toroidal shape extending serially through said rings, the respective pole faces, the armature and said permanent magnet and energized by the latter to draw said armature against said pole faces, a multiple turn winding disposed between said pole pieces and within said series flux circuit and adapted when energized to create magnetic flux threading the circuit in a direction opposite to the permanent magnet flux whereby to neutralize the latter at said pole faces and thereby release said armature, and extensions of said flanges terminating in opposed walls defining between them an annular gap of a high reluctance medium and of narrow thickness and cooperating with the extensions to form a magnetic shunt in parallel with said permanent magnet and externally of said flux circuit, the magnetic reluctance of said shunt being such that a substantial part of the flux resulting from energization of said winding is diverted through the shunt.

2. A friction coupling as defined by claim 1 including means for energizing said winding to create in said circuit a magnetomotive force in opposition to said permanent flux and threading said shunt and said permanent magnet while maintaining the magnetization of the permanent magnet above the knee of its demagnetization curve.

3. A friction coupling as defined by claim 1 including a thin layer of non-magnetic material abutting one end of said permanent magnet and acting to increase the reluctance of the flux path through the permanent magnet as compared to the reluctance of said shunt.

4. In a magnetically controlled friction coupling, the combination of, armature and magnet mounted for relative rotation about a common axis and adapted for gripping engagement, said magnet having laterally spaced first and second pole pieces terminating in faces opposing said armature and adapted for gripping engagement therewith, said pole pieces providing opposed surfaces spaced from said faces, a permanent magnet disposed between and abutting said surfaces and cooperating therewith to complete a magnetic flux series circuit to toroidal shape extending serially through the permanent magnet, said pole pieces, and back and forth between said armature and the pole faces, said permanent magnet creating magnetic flux threading said circuit to normally attract said armature to said pole faces and thus bring the armature and magnet into gripping engagement, a winding enclosed by said flux series circuit and operable when energized to create a magnetic flux threading said series circuit and said permanent magnet in a direction opposite to the parmanent magnet flux whereby to neutralize the latter at said pole faces and thereby release the coupling, and means providing a magnetic shunt around that portion of said flux circuit which includes said permanent magnet, the magnetic reluctance of said shunt being such as to divert a substantial part of the flux produced by said winding around the permanent magnet, whereby to reduce the demagnetization force required to be applied to said permanent magnet to neutralize the permanent magnet flux at said pole faces and release said armature from said magnet.

5. A magnetically controlled coupling as defined in claim 4 including means for energizing said winding to produce a magnetomotive force opposing and substantially neutralizing said permanent magnet flux at said pole faces while maintaining the flux threading the permanent magnet above the knee of the demagnetization curve thereof.

6. In a magnetically controlled friction coupling, the combination, or armature and magnet mounted for relative rotation about a common axis and adapted for gripping engagement, said magnet having laterally spaced first and second pole pieces terminating in faces opposing said armature and adapted for gripping engagement therewith, said pole pieces providing opposed surfaces spaced from said faces, a permanent magnet disposed between and abutting said surfaces and cooperating therewith to complete a magnetic flux series circuit of toroidal shape extending serially through the permanent magnet, said pole pieces, and back and forth between said armature and the pole faces, said permanent magnet creating magnetic flux threading said circuit to normally attract said armature to said pole faces and thus bring the armature and magnet into gripping engagement, a multiple turn winding adapted when energized to a predetermined degree to create a flux threading said series circuit and said permanent magnet in a direction opposite to the permanent magnet flux and substantially neutralizing the latter at said pole faces, means for energizing said winding to a said predetermined degree, and means providing a magnetic shunt around that portion of said flux circuit including said permanent magnet and having a reluctance such as to maintain the demagnetizing flux threading said permanent magnet above the knee of the demagnetizing portion of the hysteresis loop thereof.

7. A magnetically controlled coupling as defined in claim 6 including means operable automatically as an incident to release of said coupling to separate said armature from said pole faces by a gap having a magnetic reluctance substantially less than the reluctance of said shunt.

8. A magnetically controlled coupling as defined by claim 7 in which said magnetic shunt is disposed externally of said flux circuit.

9. A magnetically controlled coupling as defined by claim 7 in which said magnetic shunt is disposed alongside said permanent magnet and on the side thereof opposite said winding.

10. In a magnetically controlled coupling, the combination of an armature and a magnet mounted for relative rotation about an axis and adapted for releasable coupling with one another, said magnet having laterally spaced first and second pole pieces terminating in faces opposing said armature and adapted for releasable magnetic attraction therewith, said pole pieces providing opposed surfaces spaced from said faces, a permanent magnet disposed between and abutting said surfaces and cooperating therewith to complete a series magnetic flux circuit extending through the permanent magnet, said pole pieces, and said armature, said permanent magnet creating magnetic flux threading said circuit to normally attract said armature to said pole faces, a multiple turn winding constituting, when energized, means to create a flux threading said series magnetic flux circuit and said permanent magnet in a direction opposite to the permanent magnet flux and substantially neutralizing the latter at said pole faces, and means providing a magnetic shunt around that portion of the magnetic flux series circuit which includes said permanent magnet.

11. A magnetically controlled friction coupling as defined in claim 10 including a thin layer of non-magnetic material abutting one end of said permanent magnet and acting to increase the reluctance of the flux path through the permanent magnet as compared to the reluctance of the shunt.

References Cited by the Examiner
UNITED STATES PATENTS

| 2,738,449 | 3/56 | Mason | 192—84 |
| 2,832,918 | 4/58 | Pierce | 192—84 |
| 3,055,470 | 9/62 | Pierce | 192—84 |

References Cited by the Applicant
UNITED STATES PATENTS

| 2,956,658 | 10/60 | Jaeschke. |
| 2,962,144 | 11/60 | Heinemann et al. |

OTHER REFERENCES

D 21,278, March 8, 1956, Germany.

DAVID. J. WILLIAMOWSKY, *Primary Examiner.*